(12) United States Patent
Lejeune et al.

(10) Patent No.: US 7,920,954 B2
(45) Date of Patent: *Apr. 5, 2011

(54) METHOD AND SYSTEM FOR MULTI-PURPOSELY CONTROLLING AN INTERNAL-COMBUSTION ENGINE ON AN ENGINE BENCH TESTING UNIT

(75) Inventors: Olivier Lejeune, Beynes (FR); Binh Kim To, Courbevoie (FR)

(73) Assignee: Institut Francais Du Petrole, Cedex (FR)

( * ) Notice: Subject to any disclaimer, the term of this patent is extended or adjusted under 35 U.S.C. 154(b) by 185 days.

This patent is subject to a terminal disclaimer.

(21) Appl. No.: 11/579,599

(22) PCT Filed: May 4, 2005

(86) PCT No.: PCT/FR2005/001172
§ 371 (c)(1),
(2), (4) Date: Jan. 18, 2008

(87) PCT Pub. No.: WO2005/116430
PCT Pub. Date: Dec. 8, 2005

(65) Prior Publication Data
US 2008/0120007 A1 May 22, 2008

(30) Foreign Application Priority Data
May 7, 2004 (FR) ..................... 04 05011

(51) Int. Cl.
*F02D 41/00* (2006.01)
(52) U.S. Cl. .................. 701/102; 701/108; 123/480

(58) Field of Classification Search .................. 701/115, 701/101–105, 108, 114; 123/468, 480, 486, 123/490, 568.21–568.28
See application file for complete search history.

(56) References Cited

U.S. PATENT DOCUMENTS

| 4,453,517 A | * | 6/1984 | Kasiewicz | ..................... 123/352 |
| 5,201,296 A | | 4/1993 | Wunning et al. | |
| 5,602,738 A | * | 2/1997 | Sasaki | ........................... 701/115 |

(Continued)

FOREIGN PATENT DOCUMENTS

DE   101 47 484 A1   4/2003

(Continued)

*Primary Examiner* — Willis R. Wolfe, Jr.
*Assistant Examiner* — Johnny H Hoang
(74) *Attorney, Agent, or Firm* — Antonelli, Terry, Stout & Kraus, LLP.

(57) ABSTRACT

A system and a method is disclosed for universal operation of an internal-combustion engine (2), comprising at least an actuator connected to a working device of the engine, an electronic card (3) including a recording medium for a programmable logic FPGA component and a card synchronization component (9, 10) for synchronizing the card according to the engine cycle. The method, generates, in the component, an angular reference point in the engine cycle for each cylinder; generates, through the component, actuator control pulses, the pulses being parameterizable in phase and in duration, independent and linked with a single cylinder, performing multiplexing of the pulses to distribute the pulses over at least one of the physical outputs of the card specific to the cylinder considered; and controlling at least one of the actuators linked with one of the physical outputs of the card specific to the cylinder considered, with at least one of the control pulses.

36 Claims, 3 Drawing Sheets

U.S. PATENT DOCUMENTS

| | | | | |
|---|---|---|---|---|
| 5,787,381 | A * | 7/1998 | Sasaki | 701/115 |
| 6,257,205 | B1 * | 7/2001 | Calvas et al. | 123/470 |
| 6,827,063 | B2 * | 12/2004 | Breitegger et al. | 123/406.58 |
| 6,999,869 | B1 * | 2/2006 | Gitlin et al. | 701/115 |

FOREIGN PATENT DOCUMENTS

| | | |
|---|---|---|
| DE | 101 60 476 A1 | 6/2003 |
| EP | 1 111 221 A2 | 6/2001 |
| GB | 1 395 027 | 5/1975 |

* cited by examiner

METHOD AND SYSTEM FOR MULTI-PURPOSELY CONTROLLING AN INTERNAL-COMBUSTION ENGINE ON AN ENGINE BENCH TESTING UNIT

CROSS REFERENCE TO RELATED APPLICATION

This application is related to U.S. application Ser. No. 11/579,586, filed Nov. 6, 2006, entitled "Method and System for Continuously Controlling An Internal Combustion Engine on an Engine Bench Testing Unit".

BACKGROUND OF THE INVENTION

1. Field of the Invention

The present invention relates to a method and to an associated system comprising an electronic card (circuit board), hereinafter TIMER PCI, providing universal operation in a type of internal-combustion engine, 2 or 4 stroke, gasoline (mono and multispark), diesel (mono and multi-injection), according to a distribution extended to up to four cylinders per card.

2. Description of the Prior Art

Operating an engine has been performed either using commercial computers used by the general public which are limited to a range of operation of an engine defined by the car manufacturer, or using specific R&D engine test bench control equipments used by car parts manufacturers to develop all the engine control strategies with use limited to a make of car.

SUMMARY OF THE INVENTION

The system and the method of the invention has the advantage of universal operation for any type of engine independent of the car manufacturer and/or the associated car parts manufacturer and provides operation open to all engine control strategy development perspectives based on the increasing power of PC compatible microcomputers.

The present invention relates to a method for operating an internal-combustion engine, comprising at least one actuator connected to a working device of the engine, an electronic card (circuit board) comprising a programmable logic component FPGA and means for synchronizing the card according to the engine cycle. The following stages are carried out with the method of the invention:
generating, with the component, an angular reference point in the engine cycle for each cylinder;
generating, with the component, actuator control pulses, which are parameterizable in phase and in duration, independent and linked to a single cylinder;
performing multiplexing of the pulses to provide distribution of the pulses to at least one of the physical outputs of the card which are linked to a cylinder;
controlling at least one of the actuators connected to one of the physical outputs linked to a cylinder, with at least one of the control pulses.

The pulses can be distributed in any order over one or more outputs.

Synchronization can be obtained from at least one of the following sensors:
for a 2-stroke engine: an angular coder, a 58× vehicle target on the engine crankshaft;
for a 4-stroke engine: a camshaft sensor and at least one angular coder, or a 58× vehicle target on the engine crankshaft.

The invention also relates to a system for operating an internal-combustion engine, comprising at least an actuator connected to a working device of the engine, an electronic card (circuit board) comprising a programmable logic component FPGA and means for synchronizing the card according to the engine cycle. In the system, the component comprises means programmed to:
generate an angular reference point in the engine cycle for each cylinder;
generate actuator control pulses, the pulses being parameterizable in phase and in duration, and being independent and linked with a cylinder;
multiplex the pulses to distribute the pulses to at least one of the physical outputs specific to a cylinder; and
control with at least one of the control pulses at least one of the actuators linked with at least one of the physical outputs specific to the cylinder.

The synchronization means can comprise:
for a 2-stroke engine, at least one of the following sensors: an angular coder or a 58× vehicle target on the engine crankshaft,
for a 4-stroke engine, a camshaft sensor and at least one of the following sensors: an angular coder or a 58× vehicle target on the engine crankshaft.

The actuator can be: an injection nozzle, a spark plug, an electromagnetic valve control, or a LASER camera shot.

At least eight control pulses can be generated per cylinder.

There can be at least four physical outputs specific to each cylinder.

BRIEF DESCRIPTION OF THE DRAWINGS

Other features and advantages of the present invention will be clear from reading the description hereafter of an embodiment given by way of non limitative example, with reference to the accompanying figures wherein.

DETAILED DESCRIPTION

Figure 1:
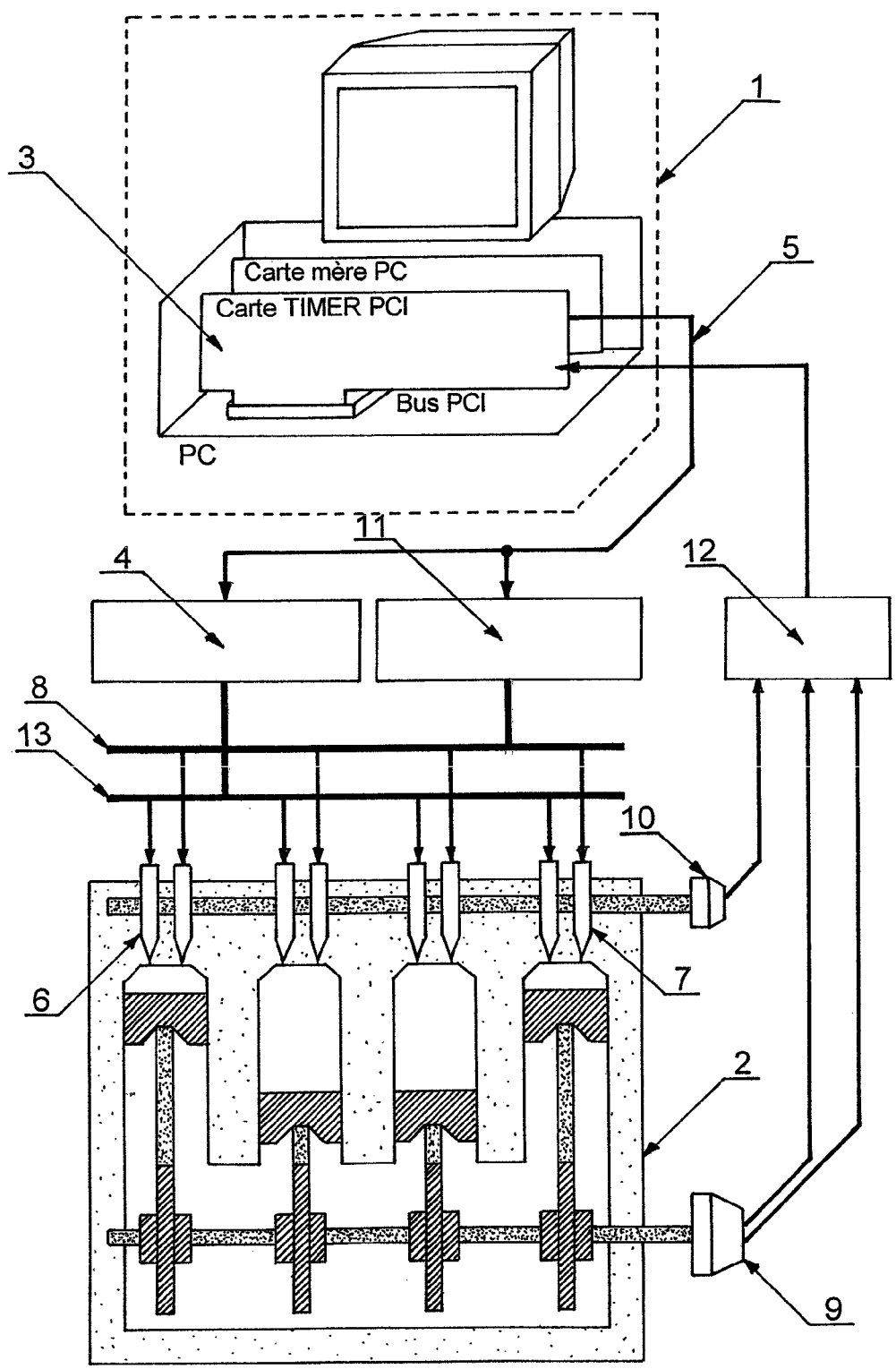
FIG. 1 diagrammatically shows the implementation of the invention.

FIG. 1 shows an engine 2 operated by a PC type computer 1 comprising a TIMER PCI type electronic circuit board or card 3. The system is synchronized to the signals provided by an angular coding system 9. The coding system can be either an angular coder delivering "revolution signal" information and "angular signal" information of a resolution equal to 1° CA, ½° CA, ⅕° CA or ¹⁄₁₀° CA, knowing that, in the figure, ° V=° CA=crank angle degree, or a 58× type vehicle target, that is having 60 teeth of 6° crank angle resolution (with 2 consecutive teeth missing) fastened to the crankshaft of engine 2. A second synchronization sensor 10 connected to the camshaft allows recognition of the revolution of the reference cylinder (usually cylinder No. 1) for a four-stroke engine whose combustion cycle equals two revolutions. Reference number 12 designates an angular coding signal conditioning and shaping block.

The TIMER PCI circuit board or card has a standard format of a PCI bus in a PC compatible microcomputer. It generates the actuator control pulses (for example in FIG. 1: fuel injection nozzles 7, spark plugs 6) via dedicated power interfaces, for example a spark generator 4 through a multiconductor 13 or an injection power interface 11 through a multiconductor 8, themselves connected to the circuit board or card by a multiconductor 5.

The TIMER PCI circuit board or card comprises a FPGA (Field Programmable Gate Array) type programmable logic component, a component forming the interface with the PCI bus of the PC compatible microcomputer, circuits providing electrical isolation of the inputs/outputs and circuits providing the required supplies.

The FPGA component contains all the functionalities provided by the TIMER PCI board. They are described in VHDL language (Very High Speed Integrated Circuit "VHSIC" Hardware Description Language). The organization of these functionalities is the core of the present invention.

It allows generation of up to 8 control pulses per cylinder per engine cycle, for a diesel or gasoline 2 or 4 stroke engine up to 4 cylinders.

This architecture is based on taking into account 4 complex logic synchronization inputs coming, on the one hand, from an angular coding system 9 of the engine crankshaft such as an angular coder or a 58× vehicle target and, on the other hand, from a camshaft sensor AAC of any type.

It allows controlling 16 electrically isolated (mass decoupling) complex logic outputs for generation of the control pulses (4 outputs per cylinder). Each control pulse is parameterized for each engine cycle by phase and a duration. The phase is always expressed in crank angle degrees according to a selected angular precision (1° CA, ½° CA, ⅕° CA or ¹⁄₁₀° CA). The duration can be expressed in crank angle degrees according to a selected angular precision (1° CA, ½° CA, ⅕° CA or ¹⁄₁₀° CA) or to a selected time precision expressed in microseconds (µs).

Part of the invention pertains to the organization of the VHDL functionalities of the FPGA component of the TIMER PCI board. It allows operation in a universal manner any type of 2 or 4 stroke engine, gasoline or diesel, multi-injection or multi-spark, according to an arrangement ranging from 1 to 4 cylinders per TIMER PCI circuit board or card. Several TIMER PCI cards can be associated to meet an arrangement with more than 4 cylinders.

The invention associates with each cylinder a specific reference called "Combustion top dead center PMH", knowing that the working order of the cylinders of a 4-stroke engine is 1/3/4/2. The 8 control pulses (per channel or per cylinder) are phase and duration programmable in relation to their respective "combustion" top dead center PMH.

Figure 2:
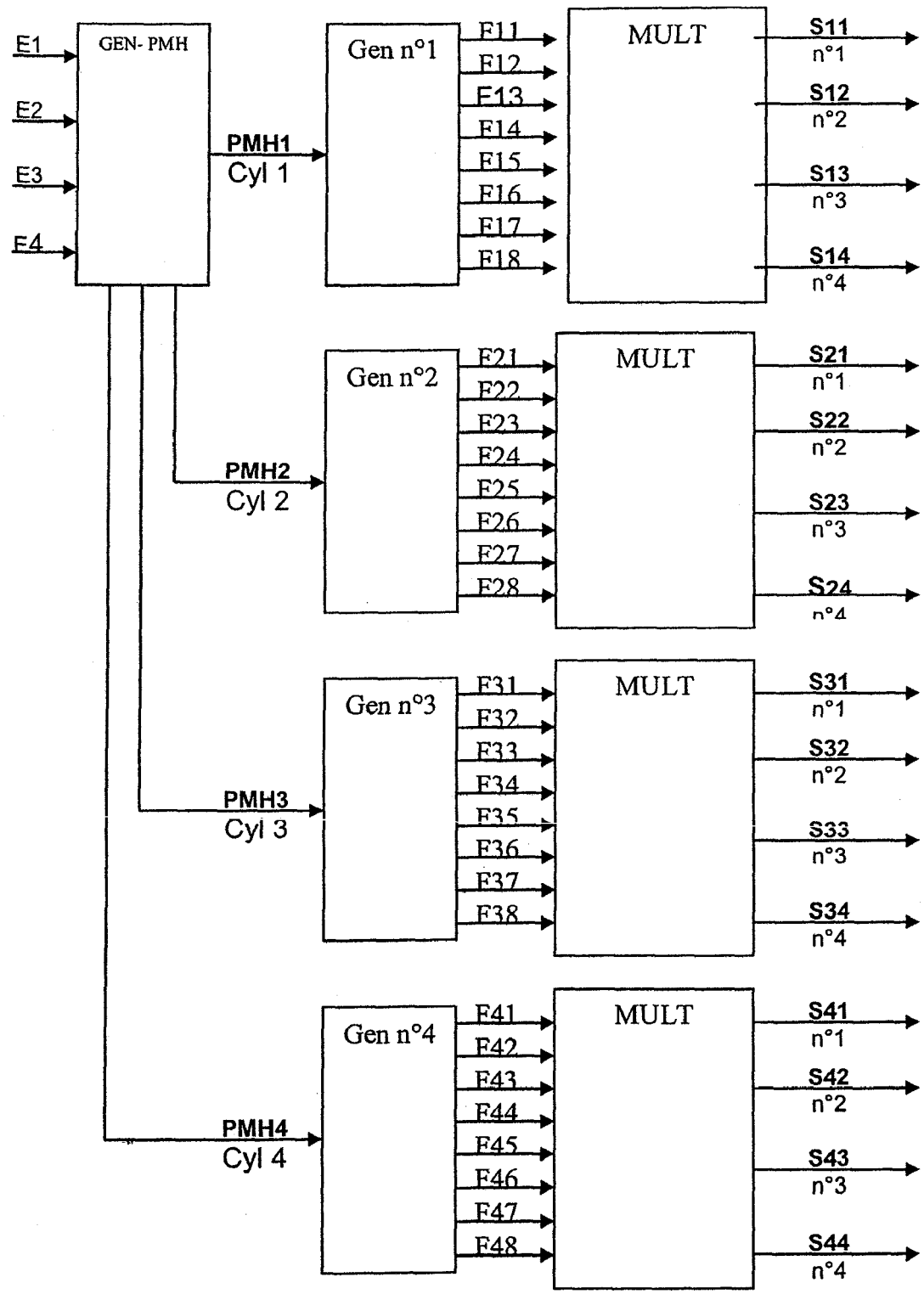
FIG. 2 describes the structure and the organization of the implementation of the invention.

FIG. 2 shows a block diagram of the FPGA. The FPGA is divided up into four totally identical subassemblies (cylinder 1 to cylinder 4).

Each one of these block diagrams provides:

generation (GEN-PMH) of a top dead center PMH specific to the cylinder considered (PMH1, PMH2, PMH3, PMH4), wherein:

E1 is the input of the "angular signal" of the angular coder (1° CA, ½° CA, ⅕° CA or ¹⁄₁₀° CA);

E2 is the input of the AAC signal of the camshaft sensor;

E3 is the input of the "revolution signal" of the angular coder; and

E4 is the input of the signal of the 58× vehicle target (60-teeth ring with 2 consecutive teeth missing);

generation (GEN1-4) of 8 independent pulses specifically linked with the associated cylinder, Fxy representing an internal signal characterized by the presence of a pulse defined by phase and a duration per engine cycle on the associated cylinder x, y from 1 to 8;

multiplexing (MULT) of the 8 previous pulses in order to ensure distribution thereof over each of the 4 physical outputs, specifically linked with the cylinder, Sxz: output z (1-4) of a signal can be the combination of signals Fxy per engine cycle on cylinder x.

This distribution can be operated in a flexible way by programming and allows output of from 0 to 8 pulses, in any order, to any one of the four physical outputs.

What is referred to as "pulse" is the elementary actuator control protocol. The pulse is a combination of two parameters: "phase" which designates the angular position at the start or at the end of the actuator control on the engine cycle considered, and "duration" which designates, from the "phase" above, the time when control of the actuator on the associated engine cycle is stopped.

Figure 3:
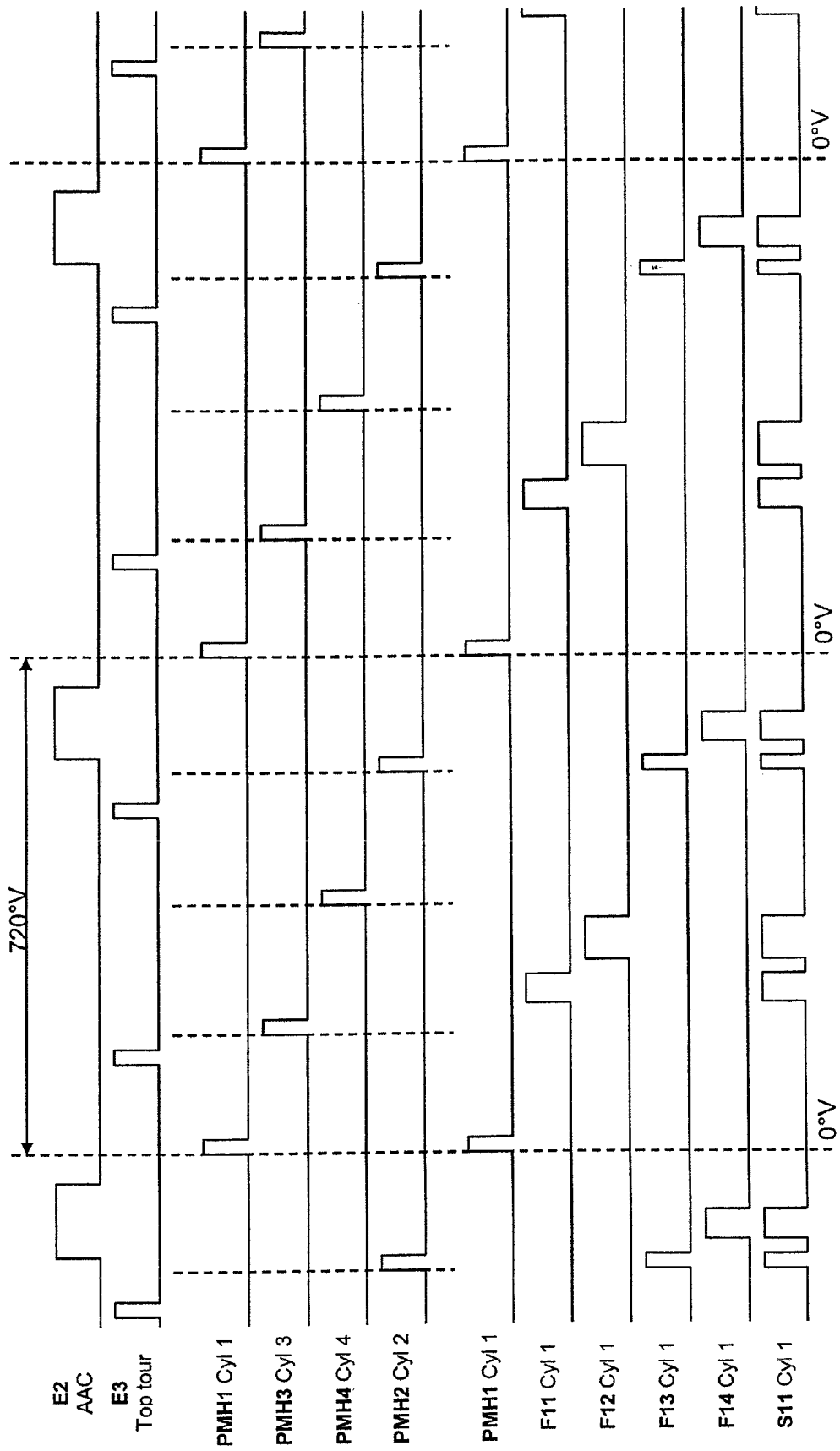
FIG. 3 shows an example of signal generation.

FIG. 3 shows an example of generation of a signal S11 which is a combination of signals F11, F12, F13 and F14 on reference frame PMH1 corresponding to cylinder 1. Reference frame PMH1 is made up from references E2 (AAC) and E3 (revolution signal).

Two examples showing the flexibility of such an organization are described hereafter.

Example 1

Operating a Conventional 4-Stroke Gasoline 4-Cylinder Engine

This engine is operated by controlling 4 ignition coils and 4 injection nozzles. Each one of these 8 actuators requires a logic output of the TIMER PCI circuit board or card. Finally, each one of these 8 logic outputs must have an elementary control pulse described by its phase and duration parameterization.

Logical parameterization of the TIMER PCI circuit board or card from the PC compatible microcomputer generates two pulses per cylinder and assigns each one of these two pulses to a distinct logic output. Thus, operating an engine can be performed without bringing any material change to the TIMER PCI circuit board or card.

Example 2

Operating a Multiple-Injection (8 Injections Per Engine Cycle) 4-Stroke Common Rail Diesel 4-Cylinder Engine This engine is operated by controlling 4 injection nozzles. Each one of these four actuators requires a logic output of the TIMER PCI circuit board card. Finally, each one of these 4 logic outputs must have a set of 8 elementary control pulses defined by their phase and duration parameterization.

Logical parameterization of the TIMER PCI circuit board or card from the PC compatible microcomputer thus generates 8 pulses per cylinder and assigns all of these eight pulses to a single logic output. Thus, operating the engine can be performed without bringing any material change to the TIMER PCI circuit board or card.

The invention claimed is:

1. A method of operating an internal-combustion multiple cylinder engine, including at least one actuator connected to a working device of the engine, a programmable logic component with multiple physical outputs and means for synchronizing the component according to an engine cycle, comprising:

the component generating an angular reference point in the engine cycle for each cylinder;

the component generating actuator control pulses with each pulse being programmed with phase and duration information relative to the angular reference point, being independent and being linked to one of the multiple cylinders;

the component distributing the control pulses to at least one physical output of the component with each pulse being assigned to one of the multiple cylinders; and controlling with the control pulses at least one of the actuators linked to one of the physical outputs assigned to one of the multiple cylinders.

2. A method as claimed in claim 1, wherein the pulses are distributed in any order to at least one of the outputs.

3. A method as claimed in claim 1, wherein the engine comprises a camshaft and a crankshaft and the means for synchronization of the component comprises at least one of the following sensors:

for a 2-stroke engine, an angular coder or a 58× vehicle target on the camshaft of the engine; and for a 4-stroke engine, a sensor of the camshaft and at least one of an angular coder or a 58× vehicle target on the crankshaft.

4. A method as claimed in claim 2, wherein the engine comprises a camshaft and a crankshaft and the means for synchronization of the component comprises at least one of the following sensors:

for a 2-stroke engine, at least one of an angular coder or a 58× vehicle target on the engine crankshaft; and for a 4-stroke engine, a sensor of the camshaft and at least one of an angular coder or a 58× vehicle target on the crankshaft.

5. A method as claimed in claim 1 wherein the component generates at least eight control pulses per cylinder.

6. A method as claimed in claim 2 wherein the component generates at least eight control pulses per cylinder.

7. A method as claimed in claim 3 wherein the component generates at least eight control pulses per cylinder.

8. A method as claimed in claim 4 wherein the component generates at least eight control pulses per cylinder.

9. A method as claimed in claim 1 wherein the component generates at least four physical outputs to each cylinder.

10. A method as claimed in claim 2 wherein the component generates at least four physical outputs to each cylinder.

11. A method as claimed in claim 3 wherein the component generates at least four physical outputs to each cylinder.

12. A method as claimed in claim 4 wherein the component generates at least four physical outputs to each cylinder.

13. A method as claimed in claim 1, wherein the at least one actuator comprises at least one of an injection nozzle, a spark plug, an electromagnetic valve control, and a LASER camera shot.

14. A method as claimed in claim 2, wherein the at least one actuator comprises at least one of an injection nozzle, a spark plug, an electromagnetic valve control, and a LASER camera shot.

15. A method as claimed in claim 3, wherein the at least one actuator comprises at least one of an injection nozzle, a spark plug, an electromagnetic valve control, and a LASER camera shot.

16. A method as claimed in claim 4, wherein the at least one actuator comprises at least one of an injection nozzle, a spark plug, an electromagnetic valve control, and a LASER camera shot.

17. A method as claimed in claim 5, wherein the at least one actuator comprises at least one of an injection nozzle, a spark plug, an electromagnetic valve control, and a LASER camera shot.

18. A method as claimed in claim 6, wherein the at least one actuator comprises at least one of an injection nozzle, a spark plug, an electromagnetic valve control, and a LASER camera shot.

19. A method as claimed in claim 7, wherein the at least one actuator comprises at least one of an injection nozzle, a spark plug, an electromagnetic valve control, and a LASER camera shot.

20. A method as claimed in claim 8, wherein the at least one actuator comprises at least one of an injection nozzle, a spark plug, an electromagnetic valve control, and a LASER camera shot.

21. A method as claimed in claim 9, wherein the at least one actuator comprises at least one of an injection nozzle, a spark plug, an electromagnetic valve control, and a LASER camera shot.

22. A method as claimed in claim 10, wherein the at least one actuator comprises at least one of an injection nozzle, a spark plug, an electromagnetic valve control, and a LASER camera shot.

23. A method as claimed in claim 11, wherein the at least one actuator comprises at least one of an injection nozzle, a spark plug, an electromagnetic valve control, and a LASER camera shot.

24. A method as claimed in claim 12, wherein the at least one actuator comprises at least one of an injection nozzle, a spark plug, an electromagnetic valve control, and a LASER camera shot.

25. A system for operating a multiple cylinder internal-combustion engine including at least one actuator connected to a working device of the engine, a programmable logic component with multiple physical outputs and means for synchronizing the component according to the engine cycle, wherein the component comprises a program that upon execution of the program functions to:

generate an angular reference point in an engine cycle for each cylinder;

generate actuator control pulses with each pulse being programmed with phase and duration information relative to the angular reference point, being independent and being linked to one of the multiple cylinders;

distribute the control pulses to at least one physical output assigned to one of the multiple cylinders; and control with at least one of the control pulses at least one of the actuators linked to one of the physical outputs assigned to one of the multiple cylinders.

26. A system as claimed in claim 25, wherein the component generates at least eight control pulses per cylinder.

27. A system as claimed in claim 25 wherein the component generates at least four physical outputs to each cylinder.

28. A system as claimed in claim 25, wherein the at least one actuator is any of an injection nozzle, a spark plug, an electromagnetic valve control, and a LASER camera shot.

29. A system as claimed in claim 26, wherein the at least one actuator is any of an injection nozzle, a spark plug, an electromagnetic valve control, and a LASER camera shot.

30. A system as claimed in claim 27, wherein the at least one actuator is any of an injection nozzle, a spark plug, an electromagnetic valve control, and a LASER camera shot.

31. A system as claimed in claim 25, wherein the engine comprises a camshaft and a crankshaft and the means for synchronization comprises at least one of the following sensors:

for a 2-stroke engine, an angular coder or a 58× vehicle target on the camshaft of the engine; and for a 4-stroke engine, a sensor of the camshaft and at least of an angular coder or a 58× vehicle target on the crankshaft.

32. A system as claimed in claim 26, wherein the engine comprises a camshaft and a crankshaft and the means for synchronization comprises at least one of the following sensors:
   for a 2-stroke engine, an angular coder or a 58× vehicle target on the camshaft of the engine; and
   for a 4-stroke engine, a sensor of the camshaft and at least of an angular coder or a 58× vehicle target on the crankshaft.

33. A system as claimed in claim 27, wherein the engine comprises a camshaft and a crankshaft and the means for synchronization comprises at least one of the following sensors:
   for a 2-stroke engine an angular coder or a 58× vehicle target on the camshaft of the engine; and
   for a 4-stroke engine, a sensor of the camshaft and at least of an angular coder or a 58× vehicle target on the crankshaft.

34. A system as claimed in claim 28, wherein the engine comprises a camshaft and a crankshaft and the means for synchronization comprises at least one of the following sensors:
   for a 2-stroke engine an angular coder or a 58× vehicle target on the camshaft of the engine; and
   for a 4-stroke engine, a sensor of the camshaft and at least of an angular coder or a 58× vehicle target on the crankshaft.

35. A system as claimed in claim 29, wherein the engine comprises a camshaft and a crankshaft and the means for synchronization comprises at least one of the following sensors:
   for a 2-stroke engine, an angular coder or a 58× vehicle target on the camshaft of the engine; and
   for a 4-stroke engine, a sensor of the camshaft and at least of an angular coder or a 58× vehicle target on the crankshaft.

36. A system as claimed in claim 30, wherein the engine comprises a camshaft and a crankshaft and the means for synchronization comprises at least one of the following sensors:
   for a 2-stroke engine, an angular coder or a 58× vehicle target on the camshaft of the engine; and
   for a 4-stroke engine, a sensor of the camshaft and at least of an angular coder or a 58× vehicle target on the crankshaft.

* * * * *